United States Patent [19]
Kronstadt

[11] Patent Number: 5,713,443
[45] Date of Patent: Feb. 3, 1998

[54] TRANSMISSION CLUTCH BRAKE

[75] Inventor: Victor Kronstadt, Hagerstown, Md.

[73] Assignee: Mack Trucks, Inc., Allentown, Pa.

[21] Appl. No.: 707,964

[22] Filed: Aug. 30, 1996

[51] Int. Cl.$^6$ ..................................................... F16D 67/02
[52] U.S. Cl. .................................. 192/13 R; 192/18 R
[58] Field of Search .............................. 192/13 R, 18 R

[56] References Cited

U.S. PATENT DOCUMENTS

| | | |
|---|---|---|
| 1,991,625 | 2/1935 | Peterson . |
| 2,213,111 | 8/1940 | Strout . |
| 2,863,537 | 12/1958 | Root .................................. 192/13 R |
| 3,077,252 | 2/1963 | Treer . |
| 3,105,579 | 10/1963 | Moore et al. . |
| 3,563,114 | 2/1971 | Casale . |
| 3,722,643 | 3/1973 | Kempf et al. ...................... 192/13 R |
| 3,915,269 | 10/1975 | Houser . |
| 3,954,026 | 5/1976 | Rittmann et al. . |
| 4,024,937 | 5/1977 | Hoepfl et al. . |
| 4,108,295 | 8/1978 | de Gennes . |
| 4,512,450 | 4/1985 | Babcock . |
| 4,579,203 | 4/1986 | Link . |
| 5,031,739 | 7/1991 | Flotow et al. . |
| 5,285,881 | 2/1994 | Lero et al. . |

*Primary Examiner*—Richard M. Lorence
*Attorney, Agent, or Firm*—Rothwell, Figg, Ernst & Kurz, P.C.

[57] ABSTRACT

A clutch brake is provided for a motor vehicle transmission clutch assembly having a brake disc within a rotatable transmission input shaft axially received within a central opening in the disc. The disc is connected to the input shaft for concurrent rotation therewith. The input shaft has a first end extending into a transmission housing member for connecting the input shaft to a transmission assembly, and an opposite second end extending into a clutch assembly for releasably connecting the input shaft to an adjacent engine crankshaft. A clutch housing member is connected to the clutch assembly which moves along the input shaft in an axial direction toward the transmission housing member during release of the clutch assembly from the input shaft. The brake disc is located along the input shaft between the transmission housing member and the clutch housing member. A clutch brake assembly is connected to the transmission housing member, the clutch brake assembly having a first caliper brake pad located on one rotational side of the disc and a second caliper brake pad located on an opposite rotational side of the disc. The first caliper brake pad is connected to an engagement member extending toward and being in engageable alignment with the clutch housing member. During movement of the clutch housing member toward the transmission housing member, the clutch housing member engages the engagement member of the first caliper brake pad so as to squeeze the disc between the first and second pads and thereby slow rotation of the disc.

8 Claims, 5 Drawing Sheets

TRANSMISSION CLUTCH BRAKE

BACKGROUND OF THE INVENTION

1. Field of the Invention

The present invention relates to the field of motor vehicle transmission clutch brakes.

2. Description of the Background Art

Transmissions on modern heavy duty trucks, such as Class 8 trucks, are not synchronized, and are used in combination with two-disc engine disconnect clutches. Because of the rotating energy from the inertia of these two discs, a braking means is provided to stop the discs and the transmission input shaft when the clutch is released. Such braking means facilitates initial gear engagement at start-up. Were this not available, an inordinate amount of time would be required for the rotating parts to coast down to a stop. Furthermore, this braking means facilitates "clean release" of the clutch-driven members by stopping rotation.

The braking means currently used are friction devices driven by the transmission input shaft and actuated by compression between the clutch release bearing housing and the transmission main driving pinion cover. The actuation occurs via the clutch pedal, with the great majority of initial pedal depression releasing the clutch and the last fraction (about 1 inch) actuating the brake. This is readily perceived by the operator as a significant increase in clutch pedal effort.

While it would be desirable to actuate currently-used clutch brakes during transmission upshift for faster execution, such currently-used clutch brakes do not provide adequate durability. For this reason, currently-used clutch brakes are not recommended as an upshifting aid.

Furthermore, currently-used clutch brakes require transmission removal for servicing, which is a costly and time-consuming operation. There are two-piece clutch brake components available in the replacement market, but these are too expensive for original equipment manufacturer usage and are not perceived as cost-effective. While these currently-used two-piece components avoid the transmission removal problems, there still remains a durability problem.

Another shortcoming of currently-used clutch brakes is the brake driving means. Currently-used brake assemblies have two internal driving projections, or tangs, which are accepted into slots machined almost the full length of the transmission input shaft. For installation, the brake is slipped through a grooved end of the input shaft with the tangs in alignment with two of the grooves, which also are in alignment with the drive slots. This allows the brake component to slide onto the shaft and float, or move freely, with respect to the shaft. The depth of these grooves significantly alters the strength of the shaft and presents a costly alternative to increasing shaft strength while still providing a clutch brake driving means.

There remains a need in the art for improved transmission clutch braking systems.

SUMMARY OF THE INVENTION

In accordance with the present invention, a clutch brake is provided for a motor vehicle transmission clutch assembly having a brake disc within a rotatable transmission input shaft axially received with a central opening in the disc. The disc is operably connected to the input shaft for concurrent rotation therewith. The input shaft has a first end extending into a transmission housing member for operably connecting the input shaft to a transmission assembly, and an opposite second end extending into a clutch assembly for releasably connecting the input shaft to an adjacent engine crankshaft. A clutch housing member is connected to the clutch assembly which moves along the input shaft in an axial direction toward the transmission housing member during release of the clutch assembly from the input shaft. The brake disc is located along the input shaft between the transmission housing member and the clutch housing member. A clutch brake assembly is connected to the transmission housing member, the clutch brake assembly having a first caliper brake pad located on one rotational side of the disc and a second caliper brake pad located on an opposite rotational side of the disc. The first caliper brake pad is operably connected to an engagement member extending toward and being in engageable alignment with the clutch housing member. During movement of the clutch housing member toward the transmission housing member, the clutch housing member engages the engagement member of the first caliper brake pad so as to squeeze the disc between the first and second pads and thereby slow rotation of the disc.

DETAILED DESCRIPTION OF THE PREFERRED EMBODIMENTS

Figure 1:
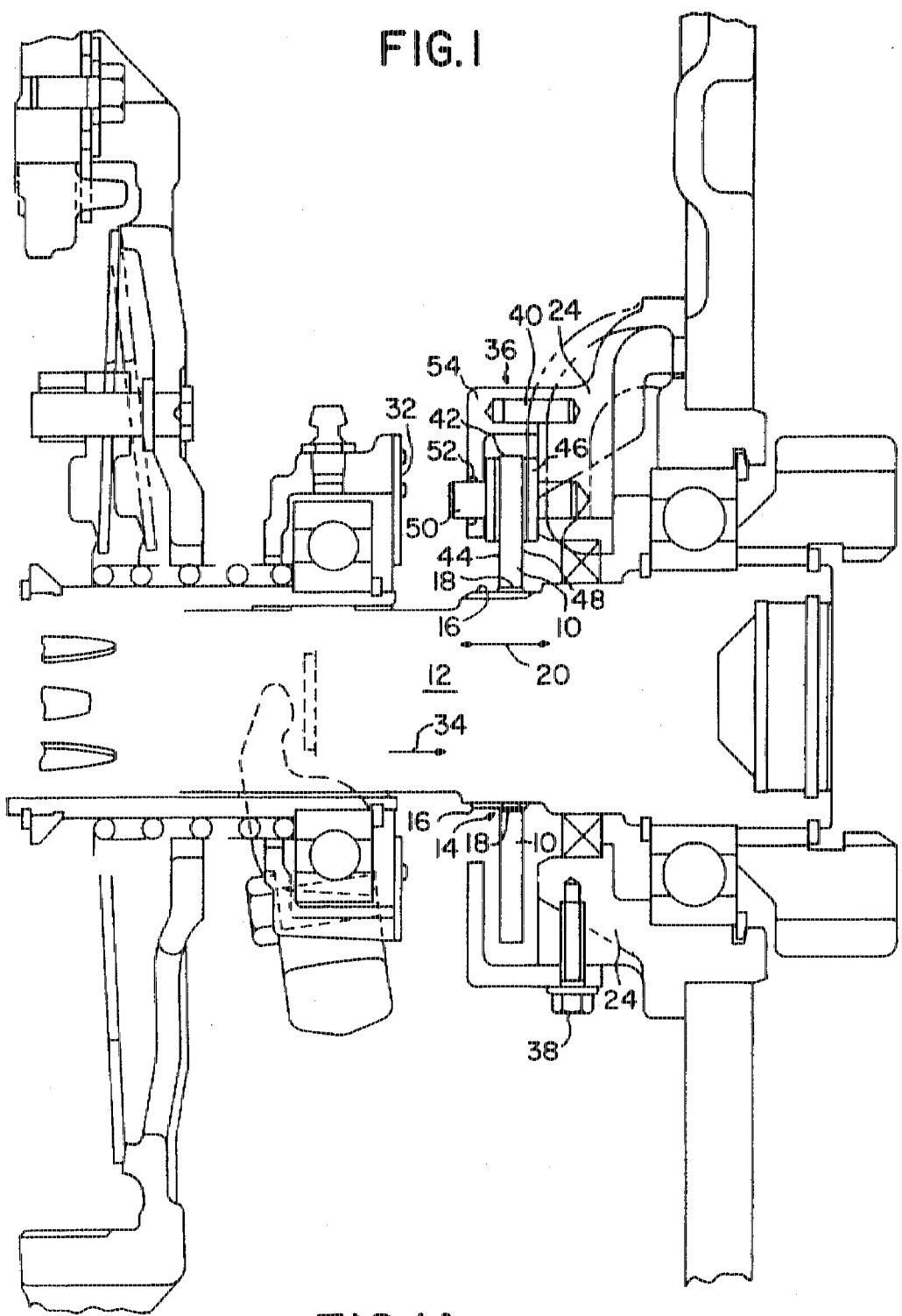
FIG. 1 is a side plan view, with portions in cross-section and portions broken away, of a clutch brake assembly in accordance with the present invention.

With reference to FIG. 1, a clutch brake assembly in accordance with one embodiment of the present invention is shown, and includes a brake disc 10.

A rotatable transmission input shaft 12 is axially received within a central opening in the disc 10.

Disc 10 is operably connected to the input shaft 12 for concurrent rotation with input shaft 12. In the embodiment shown in FIG. 1, disc 10 is rotationally connected to input shaft 12 by means including at least one spline 16 on the outer surface of input shaft 12, two of which splines 16 are shown in FIG. 1. Splines 16 engage corresponding indentations 18 in disc 10 so that disc 10 and input shaft 12 rotate concurrently. In preferred embodiments, an array of splines 16 is provided on the outer surface of shaft 12, the array being circumferentially located on the outer surface of shaft 12 for engagement with the corresponding indentations 18 of disc 10. In particularly preferred embodiments, disc 10 is not tightly press-fitted on shaft 12, but is sufficiently loose to permit movement thereof in an axial direction along shaft 12, as represented by double-headed arrow 20, while disc 10 engages splines 16 and concurrently rotates with shaft 12.

Figure 2:
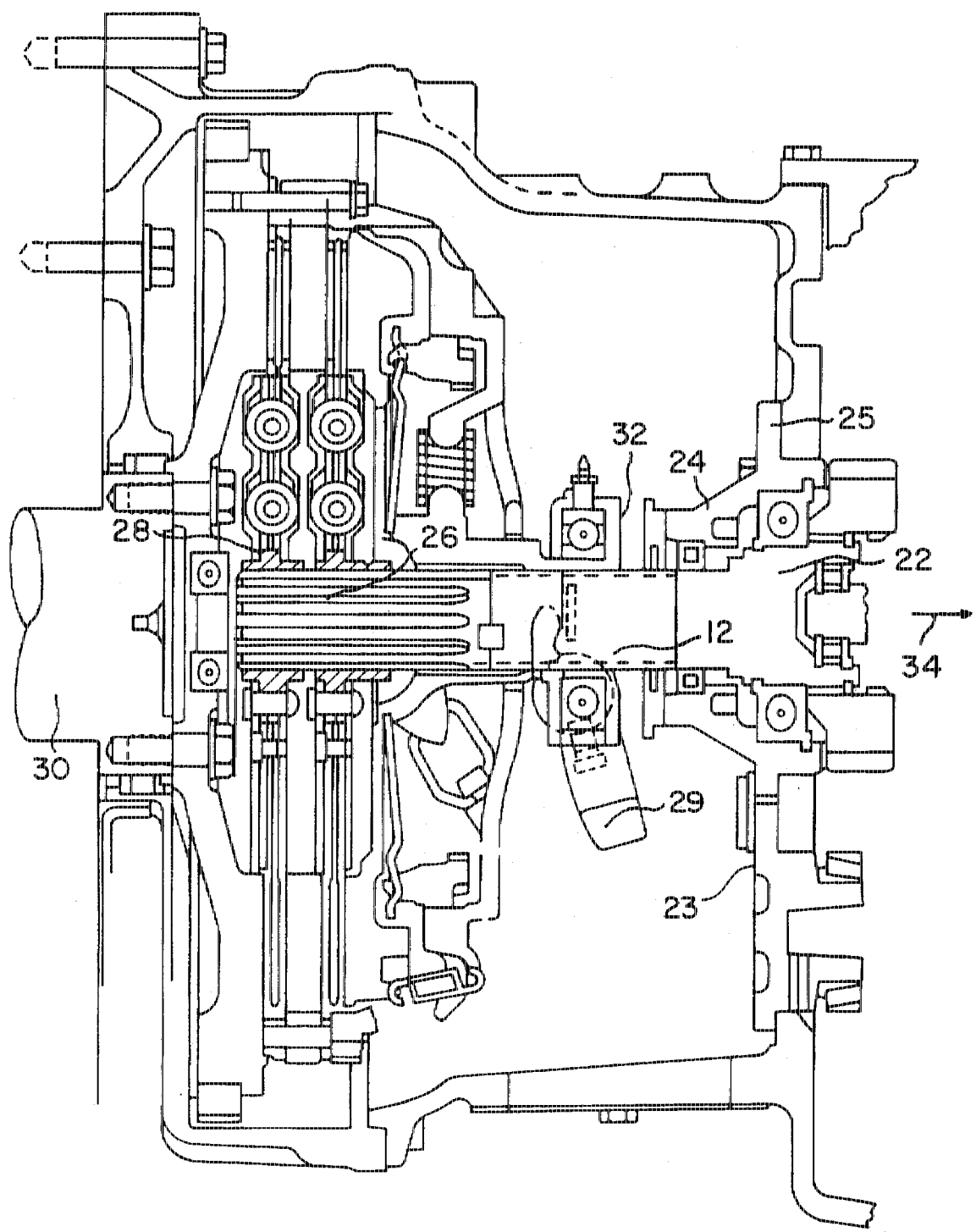
FIG. 2 is a side plan view, with portions in cross-section and portions broken away, of a motor vehicle transmission clutch assembly to which the present invention is applicable.

The present invention is applicable to motor vehicle transmission clutch assemblies which are well known in the art. One motor vehicle transmission clutch assembly to which the invention is applicable is represented in FIG. 2, which shows transmission input shaft 12 having a first end 22 extending into a transmission housing member 24 for operably connecting the transmission input shaft 12 to a transmission assembly. An opposite second end 26 of transmission input shaft 12 extends into a clutch assembly 28 for releasably connecting the input shaft 12 to an adjacent engine crankshaft 30. A clutch release bearing housing member 32, connected to clutch assembly 28, moves along transmission input shaft 12 in an axial direction represented by arrow 34, toward the transmission housing member 24 during release of clutch assembly 28 from the second end 26 of transmission input shaft 12. Other features include a transmission case front wall 23, a transmission input pinion cover 25, and a clutch release yoke 29. These features, and other features which are well known to persons skilled in the art, will not be described in detail herein.

Referring back to FIG. 1, it can be seen that brake disc 10 is located along transmission input shaft 12 between the transmission housing member 24 and a clutch housing member 32.

A caliper brake assembly 36 which is accessible for service without transmission removal is connected to and mounted on the transmission housing member 24 by means including retainer bolt 38 and locating pin 40, in the embodiment shown. Caliper brake assembly 36 includes a first caliper brake pad 42 located on one rotational side 44 of disc 10, and a second caliper brake pad 46 located on an opposite rotational side 48 of disc 10. As shown in FIG. 1, brake pads 42 and 46 are in substantial axial alignment with each other. Brake pads 42 and 46 are faced with one or more of any of the well-known coventional brake pad friction materials that enables slowing and stopping disc 10 when force is applied thereto.

The first caliper brake pad 42 is operably connected to an engagement member pin 50 extending toward and being in engageable alignment with clutch housing member 32.

Figure 3:
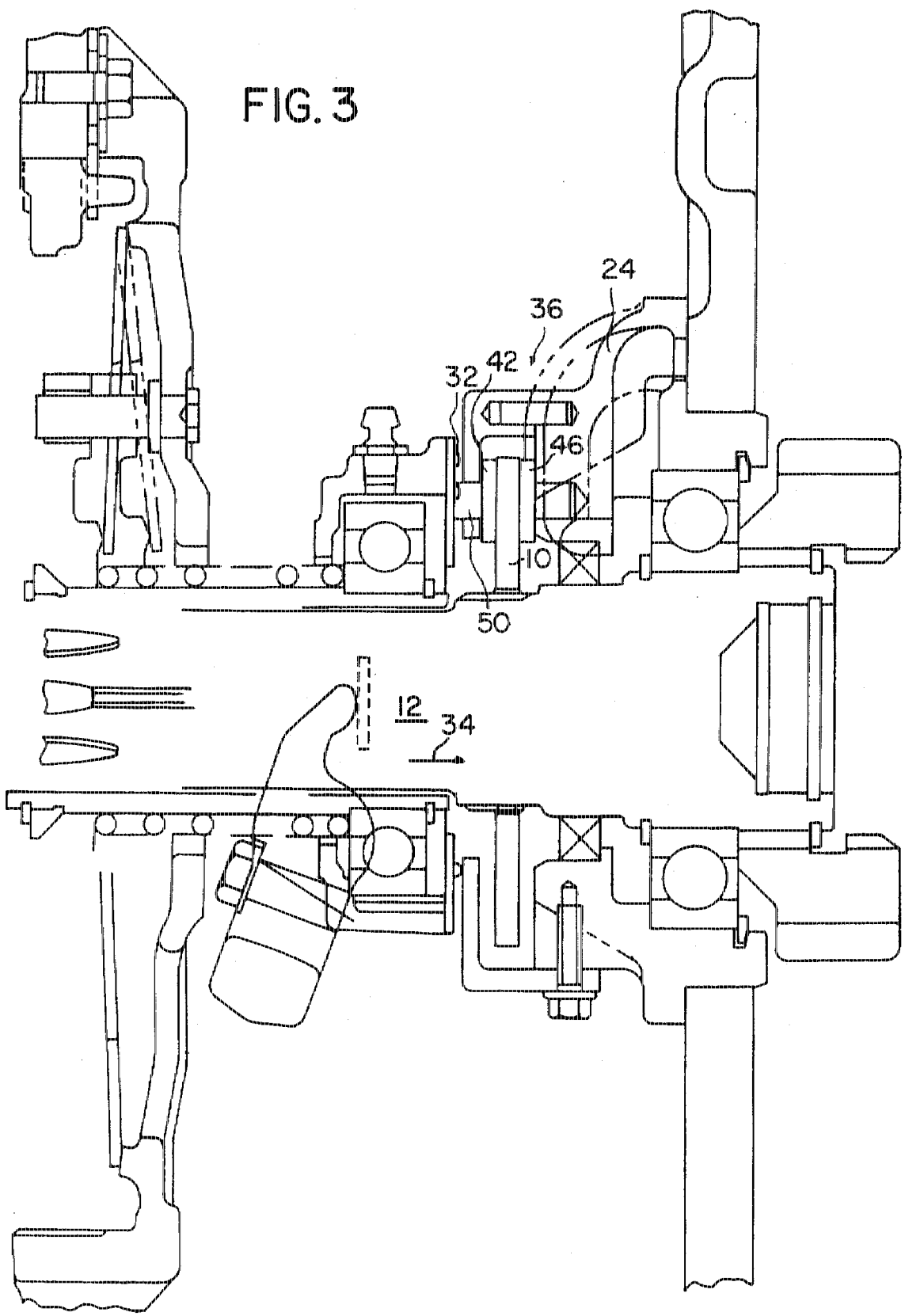
FIG. 3 is a side plan view, with portions in cross-section and portions broken away, of the clutch brake assembly of FIG. 1 shown in a clutch brake engagement position.

During movement of clutch housing member 32 from the position shown in FIG. 1, toward the transmission housing member, to the position shown in FIG. 3, clutch housing member 32 engages engagement member 50 of the first caliper brake pad 42 so as to squeeze disc 10 between the first and second brake pads 42 and 46, respectively, and thereby slow rotation of disc 10 and, concurrently therewith, transmission input shaft 12. Engagement member 50 is engaged by clutch housing member 32 after release of the clutch. In accordance with this embodiment, movement of clutch housing member 32 in the direction of arrow 34 toward the transmission housing member 24 forces the first brake pad 42 against disc 10 and, in turn, forces disc 10 against the second brake pad 46 so as to squeeze disc 10 between pads 42 and 46 to thereby slow rotation of disc 10, and shaft 12 connected to disc 10. Engagement member 50 extends beyond caliper retainer 54 so as to compensate for wear on either disc pads 42 and 46, and/or disc 10.

Figure 1A:
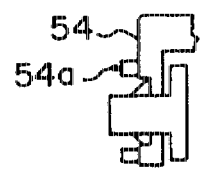
FIG. 1A is a side plan view, with portions broken away, of details of an alternative embodiment of the invention.

If desired, means for allowing disc 10 to slip at a pre-determined value can be provided to limit torque applied to disc 10 and prevent overload damage thereto. Such torque limiting means 52 is shown schematically in FIG. 1, and utilizes "Belleville" springs or similar devices which can be located between engagement member 50 and caliper retainer 54. If necessary, the caliper retainer 54 can be provided with projections 54a that stop the travel of the housing member 32 after compressing the Belleville springs. See FIG. 1A.

Figure 4:
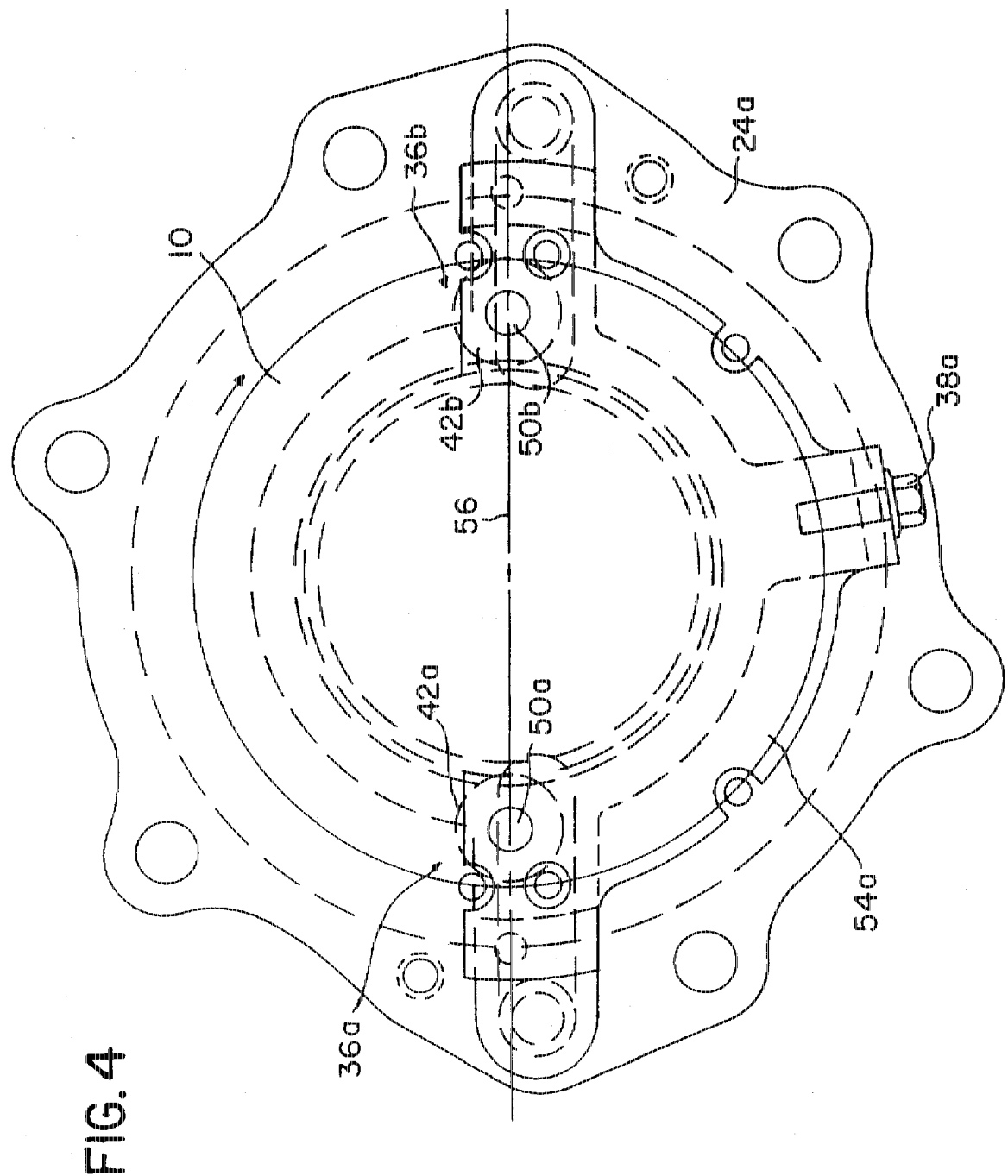
FIG. 4 is a front elevational view, with portions in cross-section and portions broken away, of a clutch brake dual caliper assembly in accordance with another embodiment of the invention.

While FIG. 1 shows a single clutch brake assembly 36, FIG. 4 shows a preferred embodiment utilizing a pair of clutch brake assemblies 36a and 36b positioned on circumferentially opposite sides of disc 10. Each clutch brake assembly 36a, 36b includes respective corresponding first caliper brake pads 42a, 42b and opposed respective second caliper brake pads (not shown) on an opposite rotational side of disc 10. Each brake pad 42a, 42b includes a respective engagement member 50a, 50b for engagement with a clutch housing member (not shown in FIG. 4) during movement of the clutch housing member toward the transmission housing member 24a. The clutch brake assemblies 36a, 36b are positioned on opposite sides of the caliper retainer 54a which is attached to the transmission input pinion cover of transmission housing member 24a by caliper retainer bolt 38a. Clutch brake assemblies 36a, 36b are located about 180° apart along the transmission horizontal centerline 56 so that the clutch housing member (not shown) loads each engagement member 50a, 50b about equally during movement of the clutch housing member toward transmission housing member 24a, so as to apply approximately equal braking force to disc 10. If desired, the invention can utilize more than one pair of brake assemblies 36a, 36b.

Figure 5A:
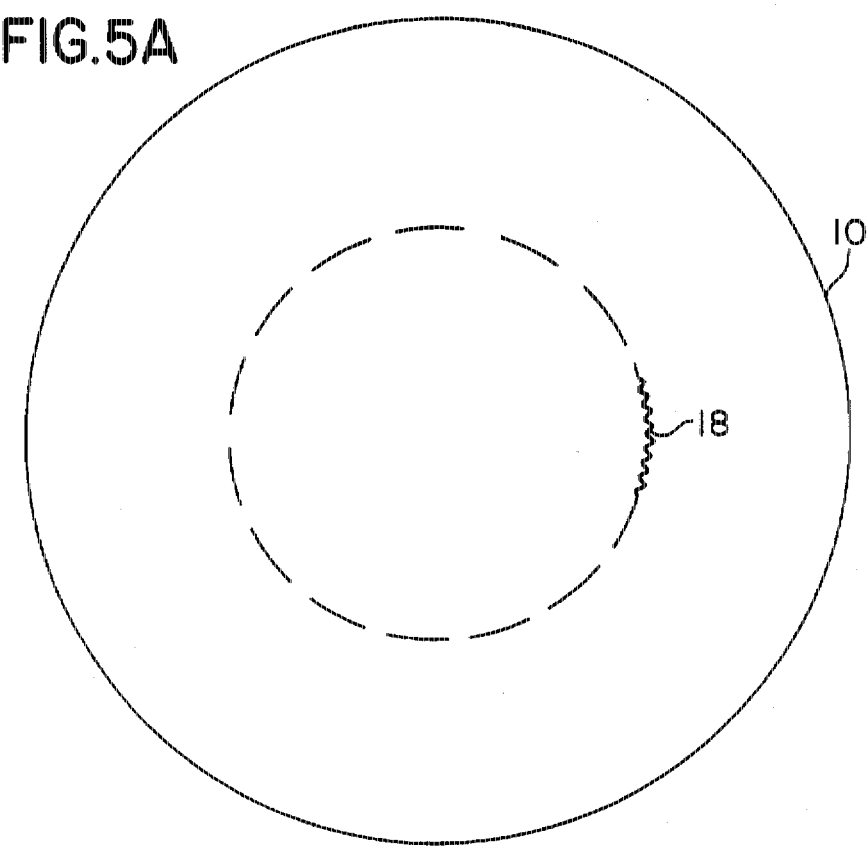
FIGS. 5A and 5B are schematic diagrams respectively showing solid and separable disc configurations for use in accordance with the present invention.
Figure 5B:
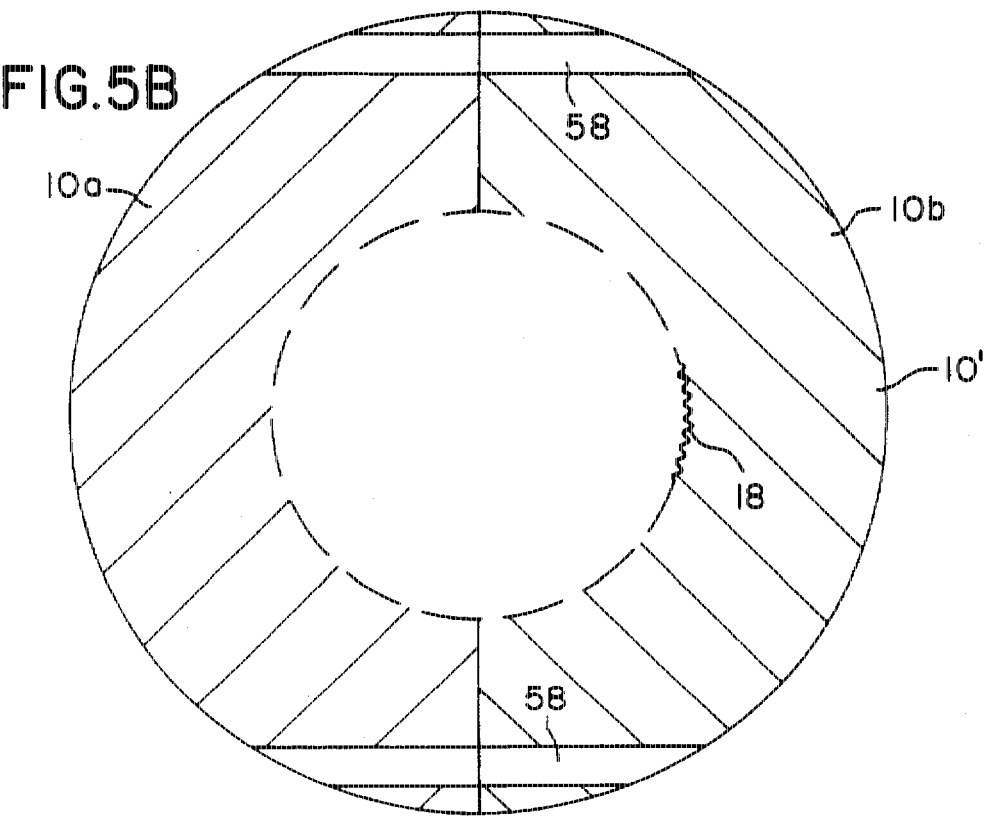

FIGS. 5A and 5B show two possible disc constructions which are suitable for use in accordance with the present invention, although other disc constructions are envisioned. FIG. 5A shows a disc 10 having a solid configuration with a portion of the toothed spline engagement members 18 shown, for engagement with a corresponding spline array on a transmission input shaft. FIG. 5B shows a separable disc 10' showing a portion of the toothed spline engagement members 18 for engagement with a corresponding spline array on a transmission input shaft. In preferred embodiments, engagement members 18 extend completely around the internal opening of disc 10'. Disc 10' includes two disc halves 10a, 10b which can be held together by any suitable means, such as bolts 58. The split configuration of disc 10' allows servicing of the friction members without removal of the transmission. The disc can be made of any suitable material, such as steel. An emplemplary disc has an outer diameter of 5.25", a thickness of 0.25" and a 46-tooth spline having a 2.30" pitch diameter.

The present invention provides a wear-compensating caliper clutch brake assembly which is smoothly operated and can be easily serviced. The spline arrangement for connecting the disc to the transmission input shaft provides a strong connection without weakening the input shaft, and enables alternate (stronger) spline configurations at the input end of the shaft, because the brake driving means of the current invention is independent of the input spline. The spline arrangement and the caliper components allow the disc to be retained axially along the transmission input shaft as well as float along the spline to compensate for wear. Use of a multi-piece disc allows servicing of the friction members without transmission removal.

Because many modifications, variations and changes in detail may be made to the described embodiments, it is intended that all matter in the foregoing description and shown in the accompanying drawings be interpreted as illustrative and not in a limiting sense.

We claim:

1. A clutch brake for a motor vehicle transmission clutch assembly having a brake disc with a rotatable transmission input shaft axially received within a central opening in the disc; the disc being operably connected to the input shaft for concurrent rotation therewith; the input shaft having a first end extending into a transmission housing member for connecting the input shaft to a transmission assembly, and an opposite second end extending into a clutch assembly for releasably connecting the input shaft to an adjacent engine crankshaft; a clutch housing member connected to said clutch assembly which moves along said input shaft in an axial direction toward the transmission housing member during release of said clutch assembly from said input shaft; the brake disc being located along the input shaft between the transmission housing member and the clutch housing member; a clutch brake assembly connected to said transmission housing member, the clutch brake assembly having a first caliper brake pad located on one rotational side of said disc and a second caliper brake pad located on an opposite rotational side of said disc; the first caliper brake pad being operably connected to an engagement member extending toward and being in engageable alignment with said clutch housing member; wherein during movement of said clutch housing member toward said transmission housing member, said clutch housing member engages the engagement member of said first caliper brake pad so as to squeeze said disc between the first and second pads and thereby slow rotation of said disc.

2. The assembly of claim 1 wherein, when the clutch housing member engages the engagement member of the first caliper brake pad, the first caliper brake pad is forced against said disc and, in turn, said disc is forced against said second caliper brake pad so as to squeeze said disc between said pads to thereby slow rotation of said disc.

3. The assembly of claim 1, wherein said input shaft includes a spline array which engages corresponding engagement members on said disc to operably connected said disc to the input shaft for concurrent rotation thereof.

4. The assembly of claim 3, wherein said disc is movable along said shaft in an axial direction while engaging said spline array.

5. The assembly of claim 1, wherein said first and second pads are in substantial axial alignment with each other.

6. The assembly of claim 1, wherein said disc is a multi-piece disc.

7. The assembly of claim 1, further including a torque-limiting member connected to said engagement member for protecting said disc against overload damage when said disc is squeezed between said first and second pads.

8. The assembly of claim 1, including a pair of said clutch brake assemblies connected to said housing member on circumferentially opposite sides of said disc.

* * * * *